US006341333B1

(12) United States Patent
Schreiber et al.

(10) Patent No.: US 6,341,333 B1
(45) Date of Patent: Jan. 22, 2002

(54) METHOD FOR TRANSPARENT EXCHANGE OF LOGICAL VOLUMES IN A DISK ARRAY STORAGE DEVICE

(75) Inventors: Moshe Schreiber; Ishay Kedem, both of Brookline; Yuval Ofek, Framingham; Natan Vishlitzky; Eli Shagam, both of Brookline, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/396,218

(22) Filed: Sep. 15, 1999

Related U.S. Application Data

(63) Continuation-in-part of application No. 09/143,684, filed on Aug. 28, 1998, now Pat. No. 6,237,063, which is a continuation-in-part of application No. 09/002,428, filed on Jan. 2, 1998, now Pat. No. 6,088,766, which is a continuation-in-part of application No. 08/944,606, filed on Oct. 6, 1997, now Pat. No. 6,061,761.

(51) Int. Cl.[7] .............................................. G06F 12/00
(52) U.S. Cl. ...................... 711/114; 711/167; 711/170; 709/105; 714/7
(58) Field of Search ...................... 711/114, 161–170; 714/6, 7; 709/105

(56) References Cited

U.S. PATENT DOCUMENTS

| | | | |
|---|---|---|---|
| 3,702,006 A | 10/1972 | Page | 444/1 |
| 4,633,387 A | 12/1986 | Hartug et al. | 364/200 |
| 5,239,649 A | 8/1993 | McBride et al. | 395/650 |
| 5,701,429 A | * 12/1997 | Legvold et al. | 711/114 |
| 5,835,953 A | * 11/1998 | Ohran | 711/162 |
| 6,035,412 A | * 3/2000 | Tamer et al. | 714/6 |

OTHER PUBLICATIONS

The RAID book by Paul Massiglia, Feb. 1997, Chapter 8 pp. 151–157.*

* cited by examiner

*Primary Examiner*—Do Hyun Yoo
*Assistant Examiner*—Nasser Moazzami
(74) *Attorney, Agent, or Firm*—George A. Herbster

(57) ABSTRACT

Load balancing of activities on physical disk storage devices is accomplished by monitoring reading and writing operations to blocks of contiguous storage locations, such as logical volumes on the physical disk storage devices to obtain disk utilization information. The disk utilization information provides a selection of one block pair. After testing to determine any adverse effect of making that change, an exchange is made to more evenly distribute the loading on individual physical disk storage devices. The exchange involves the use of a pair of specially configured logical volumes that receive copies of the data to be exchanged, allow a reconfiguration of the blocks in the block pair and the transfer of the data back to the other blocks in the block pair to effect the exchange.

5 Claims, 9 Drawing Sheets

METHOD FOR TRANSPARENT EXCHANGE OF LOGICAL VOLUMES IN A DISK ARRAY STORAGE DEVICE

This is a continuation-in-part of copending application for U.S. Ser. No. 09/143,684 filed Aug. 28, 1998 for a Method for Exchanging Volumes in A Disk Array Storage Device (now U.S. Pat. No. 6,237,063 granted May 21, 2001) that is a continuation-in-part of U.S. Ser. No. 09/002,428 filed Jan. 2, 1998 (now U.S. Pat. No. 6,088,766 granted Jul. 11, 2000) that is a continuation-in-part of copending application for U.S. Ser. No. 08/944,606 filed Oct. 6, 1997 (now U.S. Pat. No. 6,061,761 granted May 9, 2000) and that are all assigned to the same assignee as this invention.

The following related applications that are also assigned to the same assignee of this invention are incorporated by reference:

U.S. patent application Ser. No. 08/842,953 filed Apr. 25, 1997 for a Method and Apparatus for Independent and Simultaneous Access to a Common Data Set (now U.S. Pat. No. 6,101,497 granted Aug. 8, 2000); and U.S. patent application Ser. No. 08/396,146 filed Sep. 15, 1999 for a Mailbox for Controlling Storage Subsystem Reconfigurations.

BACKGROUND OF THE INVENTION

1. Field of the Invention

This invention generally relates to the management of resources in a data processing system and more particularly to the management of a disk array storage device.

2. Description of Related Art

Many data processing systems now incorporate disk array storage devices. Each of these devices comprises a plurality of physical disks arranged into logical volumes. Data on these devices is accessible through various control input/output programs in response to commands, particularly reading and writing commands from one or more host processors. A Symmetrix 5500 series integrated cached disk array that is commercially available from the assignee of this invention is one example of such a disk array storage device. This particular array comprises multiple physical disk storage devices or drives with the capability of storing large amounts of data up to one terabyte or more. The management of such resources becomes very important because the ineffective utilization of the capabilities of such an array can affect overall data processing system performance significantly.

Generally a system administrator will, upon initialization of a direct access storage device, determine certain characteristics of the data sets to be stored. These characteristics include the data set size, and volume names and, in some systems, the correspondence between a logical volume and a particular host processor in a multiple host processor system. Then the system administrator uses this information to configure the disk array storage device by distributing various data sets across different physical devices accordingly with an expectation of avoiding concurrent use of a physical device by multiple applications. Often times allocations based upon this limited information are or become inappropriate. When this occurs, the original configuration can degrade overall data processing system performance dramatically.

One approach to overcoming this problem has been to propose an analysis of the operation of the disk array storage device prior to loading a particular data set and then determining an appropriate location for that data set. For example, U.S. Pat. No. 4,633,387 to Hartung et al. discloses load balancing in a multi-unit data processing system in which a host operates with multiple disk storage units through plural storage directors. In accordance with this approach a least busy storage director requests work to be done from a busier storage director. The busier storage director, as a work sending unit, supplies work to the work requesting, or least busy, storage director.

U.S. Pat. No. 5,239,649 to McBride et al. discloses a system for balancing the load on channel paths during long running applications. In accordance with the load balancing scheme, a selection of volumes is first made from those having affinity to the calling host. The load across the respective connected channel paths is also calculated. The calculation is weighted to account for different magnitudes of load resulting from different applications and to prefer the selection of volumes connected to the fewest unused channel paths. An optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information. The method continues quickly during subsequent selection of the remaining volumes for processing.

In another approach, U.S. Pat. No. 3,702,006 to Page discloses load balancing in a data processing system capable of multi-tasking. A count is made of the number of times each I/O device is accessed by each task over a time interval between successive allocation routines. During each allocation, an analysis is made using the count and time interval to estimate the utilization of each device due to the current tasks. An estimate is also made with the anticipated utilization due to the task undergoing allocation. The estimated current and anticipated utilization are then considered and used as a basis for attempting to allocate the data sets to the least utilized I/O devices so as to achieve balanced I/O activity.

Each of the foregoing references discloses a system in which load balancing is achieved by selecting a specific location for an individual data set based upon express or inferred knowledge about the data set. An individual data set remains on a given physical disk unless manually reconfigured. None of these systems suggests the implementation of load balancing by the dynamic reallocation or configuration of existing data sets within the disk array storage system.

Another load balancing approach involves a division of reading operations among different physical disk drives that are redundant. Redundancy has become a major factor in the implementation of various storage systems that must also be considered in configuring a storage system. U.S. patent application Ser. No. 08/653,154 filed May 24, 1996 (now U.S. Pat. No. 5,819,310 granted Oct. 6, 1998) discloses such a redundant storage system with a disclosed disk array storage device that includes two device controllers and related disk drives for storing mirrored data. Each of the disk drives is divided into logical volumes. Each device controller can effect different reading processes and includes a correspondence table that establishes the reading process to be used in retrieving data from the corresponding disk drive. Each disk controller responds to a read command that identifies the logical volume by using the correspondence table to select the appropriate reading process and by transferring data from the appropriate physical storage volume containing the designated logical volume.

Consequently, when this mirroring system is implemented, reading operations involving a single logical volume do not necessarily occur from a single physical device. Rather read commands to different portions of a particular logical volume may be directed to any one of the mirrors for reading from preselected tracks in the logical volume. Allowing such operations can provide limited load balancing and can reduce seek times.

Other redundancy techniques and striping techniques can tend to spread the load over multiple physical drives by dividing a logical volume into sub-volumes that are stored on individual physical drives in blocks of contiguous storage locations. However, if the physical drives have multiple logical volumes, sub-volumes or other forms of blocks of contiguous storage locations, the net effect may not balance the load with respect to the totality of the physical disk drives. Thus, none of the foregoing references discloses or suggests a method for providing a dynamic reallocation of physical address space based upon actual usage.

Once a pair of logical volumes have been selected for dynamic reallocation, an exchange, or swap, can occur by selecting an unused area in one of the physical disk drives to operate as a buffer. This may be an unused area in a physical disk storage device or in a dynamic spare physical disk storage device. The general use of physical disk storage devices as dynamic spares is known in the art. In other circumstances it may be possible to utilize a cache memory, such as the cache memory 33 in FIG. 2, as a buffer. If a single buffer is to be used, a concurrent copy or other transfer sequence can move (1) a first logical volume from a first physical disk storage device to the buffer, (2) the second logical volume to the corresponding area in the first physical disk storage device and (3) the logical volume buffer to the area in the second physical disk storage device that had contained the second logical volume. Although a concurrent copy or other analogous procedure may enable the exchange to occur on-line, unacceptable performance degradation for the duration of the transfer can occur.

As described in previously identified U.S. Pat. No. 6,237,063, logical volumes acting as BCV devices, as described in the foregoing U.S. Pat. No. 6,088,766, might be adapted for performing such an exchange. For example, assuming that the first and second logical volumes are selected, the exchange process initially could transfer the data from the first and second logical volumes to the first and second BCV logical volumes, respectively. After recognizing the first and second logical volumes, the exchange would be completed by transferring the contents of the second BCV logical volume 92 to new second, i.e., the old first, logical volume and by transferring the contents of the BCV logical volume to the new first, i.e., the old second, logical volume.

This approach utilization of BCV logical volumes and the basic commands associated with such devices can require additional operations. Consequently in certain applications it is possible to produce significant delays in the normal operating procedures such that the transfer does not occur transparently to any user or application software. Moreover as conventional BCV commands do not readily lend themselves certain transfers required for an exchange, the process for making the exchange becomes cumbersome.

SUMMARY

Therefore it is an object of this invention to provide a dynamic reallocation of a disk array storage device to reduce any imbalance of load requirements on each physical disk storage device.

Another object is to provide a method for dynamically reallocating logical volumes on physical disk storage devices transparently to the normal operation of such physical disk stroage devices and logical volumes with user or application software.

Yet another object of this invention is to provide a dynamic reallocation of logical volumes in a disk array storage device that utilizes a simple process.

Yet still another object of this invention is to provide for a dynamic reallocation of logical volumes in a disk array storage device without any loss of preexisting redundancy for the logical volumes during the transfer.

In accordance with one aspect of this invention, data in two logical volumes, having first and second data processing identifications, respectively, is exchanged by establishing data transfer paths between the first and second logical volumes and third and fourth logical volumes, respectively. Then the data in the first and second logical volumes is copied to the third and fourth logical volumes, respectively, independently of and concurrently with user or application generated responses to I/O requests to the first and second logical volumes. Next the first and second logical volumes are reconfigured to have the second and first data processing identifications, respectively. Thereafter the data in the third and fourth logical volumes transfers to the second and first logical volumes, respectively.

In accordance with another aspect of this invention, data in a first logical volume, that is a mirror in a first set of mirrored logical volumes, is exchanged with data stored in a second logical volume that is a mirror in a second set of mirrored logical volumes. The method includes the steps of establishing data transfer paths between the first and second logical volumes and third and fourth logical volumes, respectively and then copying the data in the first and second logical volumes to the third and fourth logical volumes, respectively, independently of and concurrently with responses to user or application generated I/O requests to the first and second logical volumes. Upon completion of the copying, the first and second logical volumes are configured to be mirrors in the second and first sets of mirrored logical volumes, respectively; and then the data in the third and fourth logical volumes is transferred to the second and first logical volumes.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
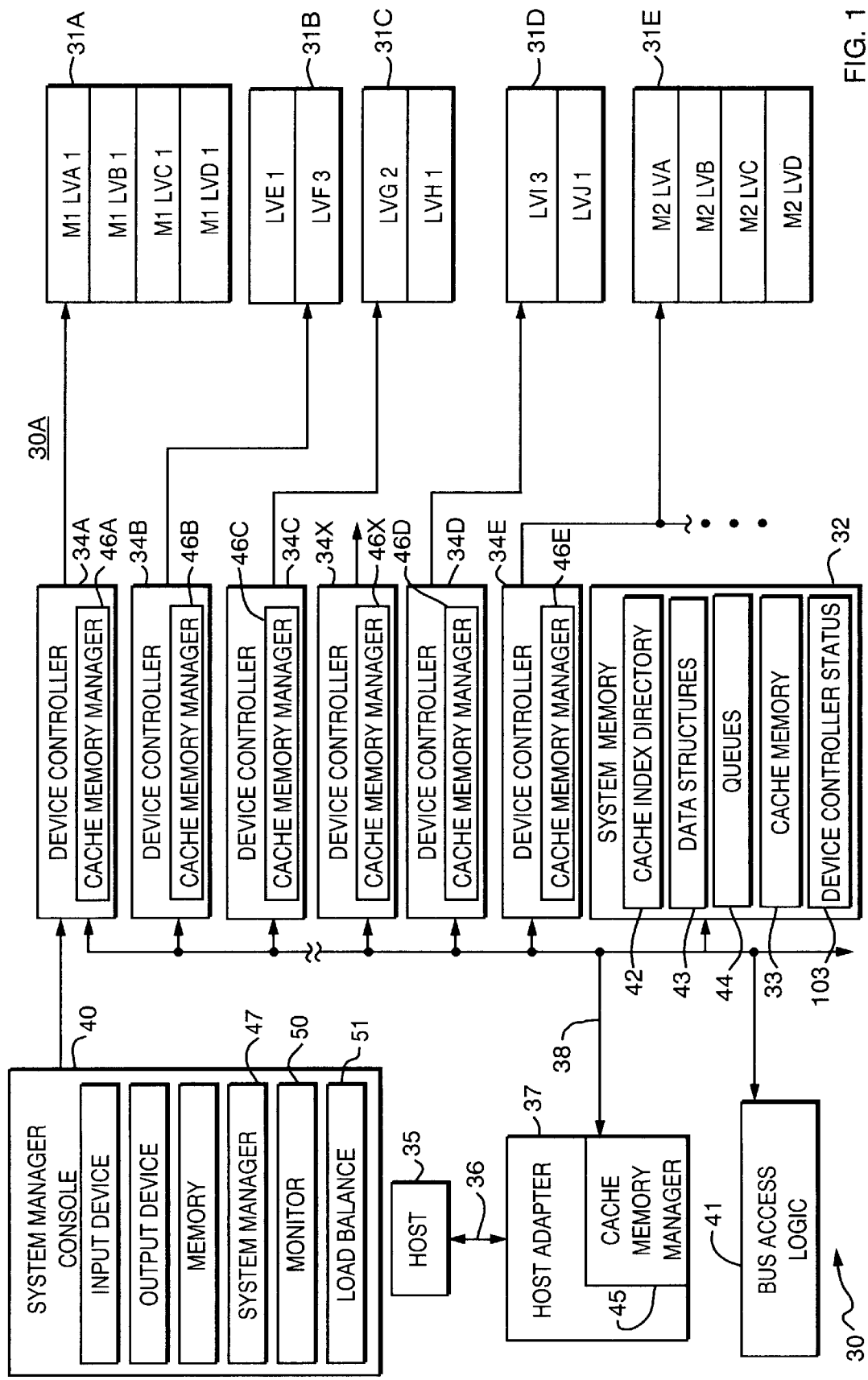
FIG. 1 is a block diagram of a specific data processing system that implements this invention.

FIG. 1 depicts, in block form, and as a typical data processing system 30, a Symmetrix 5500 series integrated cached disk array 30A that includes such a data memory system with a number of data storage devices or physical disk storage devices 31A, 31B, 31C, 31D and 31E, by way of example, and a system memory 32 with a cache memory 33. In this particular embodiment the array 30A includes several device controllers 34A, 34B, 34C, 34D and 34E connected to corresponding ones of the physical disk storage devices 31A through 31E plus a device controller 34X representing other controllers and attached physical disk storage devices. Each device controller may have a known basic structure or a more sophisticated structure associated with mirrored operations as described in the above-identified U.S. Pat. No. 5,819,310.

The device controller 34A is shown with an associated physical disk storage device 31A divided into the mirrored logical volumes M1-LVA, M1-LVB, M1-LVC and M1-LVD; the device controller 34E controls the other physical disk storage device 31E that stores the mirrored logical volumes M2-LVA, M2-LVB, M2-LVC and M2-LVD. The logical volumes in physical disk storage devices 31A and 31E are assumed to have the same size for purposes of this explanation. However, mirrored and non-mirrored logical volumes in a physical disk storage device can have different sizes. For example, physical disk storage device 31B is depicted with two logical volumes LVE and LVF.

Assume that the LVE logical volume has the same size as the logical volumes in the physical disk 31A and that the logical volume LVF has a size that is three times the size of the logical volume LVE. Physical disk storage device 31c is shown with a logical volume LVG having twice the size of a logical volume LVH which, in turn, would have the same size as the logical volume LVA. Physical disk storage device 31D has a logical volume LVI which is three times the size of the logical volume LVJ which, in turn, has the same size as the logical volume LVA.

Moreover, there is no requirement that mirrored logical volumes in one physical disk storage device need to be mirrored on a single mirroring physical disk storage device. For example the locations of the LVJ and M2-LVA logical volumes could be interchanged. As will become apparent, in actual practice the absolute and relative sizes of logical volumes and the positions of the logical volumes will vary.

Still referring to FIG. 1 a single processor or host 35, an interconnecting data access channel 36 and a host adapter 37 connect to the system memory 32 over a system bus 38. A typical data processing system 30 may comprise multiple host adapters that connect to the system bus 38 in parallel. One or more hosts may also connect to each host adapter.

A service processor or system manager console 40 includes an additional processor that connects to the system bus 38 typically through one or more of the device controllers, such as device controller 34A by means of a serial or other communications link to the device controller 34A. The system manager console 40 permits a system operator to run set-up and diagnostic programs for configuring, controlling and monitoring the performance of the disk array storage system 30A. Essentially the system manager console 40 enables the operator to establish communications with the host adapter 37, the device controller 34B and the system memory 32. In one embodiment, this invention is implemented by that system manger console or service processor 40 that communicates with various adapters and controllers as described in the above-referenced U.S. patent application Ser. No. 08/396,149.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 in FIG. 1 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables for logical devices, cylinders, and tracks. The system memory 32 also includes areas for data structures 43 and queues 44. The basic operation of the system memory 32 is described in Yanai et al., U.S. Pat. No. 5,206,939 issued Apr. 27, 1993. System memory 32, particularly the cache memory 33, may also include a region of memory known as permacache memory. As is well known, data elements remain in permacache memory unless they are specifically deleted.

The coordination of each of the host adapters with each of the device controllers is simplified by using the system memory 32, and in particular the cache memory 33, as a buffer for data transfers between each host adapter and each device controller. Such a system, for example, is described in U.S. Pat. No. 5,206,939. In such a system, it is not necessary to provide a processor dedicated to managing the cache memory 33. Instead, each of the host adapters or device controllers executes a respective cache manager program, such as one of the cache manager programs 45 in the host adapter 37 and cache manager programs 46A through 46X in each of the device controllers 34A through 34X. A system manager program 47 performs a similar function for the system manager console 40 and enables the operator to configure the system. Each of the cache manager programs accesses the cache index directory 42 and operates with data structures and queues for storing various commands. More specifically, the cache manager program 45 in the host adapter 37 writes data from the host 35 into the cache memory 32 and updates the cache index directory 42.

In addition each cache memory manager gathers statistics. The cache memory manager 45 will accumulate statistics concerning a number of parameters. For the purpose of this invention, the number of reading and writing operations requested by a host 35 or connected hosts are important. Likewise each of the cache memory managers 46A through 46X in each of the device controllers 34A through 34X gathers statistics for the logical volumes on each connected physical disk storage device. A monitor 50 in the system manager console 40 integrates these cache memory managers to obtain appropriate statistics at given intervals.

From the foregoing, disk operations included in any measure of the loading of a logical volume will include reading operations and writing operations. Reading operations can be further classified as read-hit, read-miss and sequential read operations. A read-hit operation occurs when the data to be read resides in the cache memory 33. A read-miss occurs when the data to be read is not available in the cache memory 33 and must be transferred from a physical disk storage device. Sequential read operations are those that occur from sequentially addressed storage locations.

The system operates with two types of writing operations. The first transfers the data from the host 35 to the cache memory 33. The second type transfers the data from the cache memory 33 to a physical disk storage device. The second type operates in a background mode, so it is possible that the host 35 may write data to a location more than once before the data is written to a physical disk storage device. Consequently the number of writing operations of the second type normally will not correspond to and be less than the number of writing operations of the first type.

With this background, one specific program for determining appropriate reallocations of logical volumes on physical disks in accordance with this invention can be described for background. Any program relies upon information supplied from the performance monitor 50 that retrieves statistics from each cache memory manager on a periodic basis. The periodicity will be selected according to conventional sampling criteria. Typical periods will be from up to 15 to 30 or more minutes. As each set of statistics is time stamped and accumulated by logical volume, the total number of read operations, a read-hit ratio, a sequential-read ratio and the total number of writing operations over a test interval can be obtained. One specific load balance program 51 shown in FIG. 1 then operates according to FIGS. 2A and 2B to generate, from that collected monitored performance generally represented by step 60, a reallocation or exchange of a pair of logical volumes. Specifically when it is time to perform an analysis, a wait loop represented as a decision step 61 transfers control to retrieve, by means of the performance monitor 50 in step 62, all the statistics that are relevant to the test interval.

The load balance program 51 uses step 63 to define a list of pairs of exchangeable logical volumes. There are several criteria that must be evaluated in determining this list. First, exchangeable logical volumes must have the same size. In actual practice most logical volumes will be selected from one of a relatively small number of physical sizes. Second, any interrelationship between the two logical volumes to be exchanged must be examined to determine whether there is any reason to preclude the exchange. For example, swapping logical volumes on the same physical disk storage device generally will have little or no impact. Mirroring, as described in the above-identified U.S. Pat. No. 5,819,310 or other redundancy may further restrict the available exchangeable pairs of logical volumes. For example, mirrored logical volumes normally will be precluded from residing on the same physical disk storage device or even on physical disk storage devices on the same controller or adjacent controllers. For RAID-5 redundancy, exchangeable pairs of logical volumes usually will be limited to those in the same parity group.

In the specific example of FIG. 1, based on size, the logical volumes LVA through LVE, LVH and LVJ are all potential exchange candidates. Likewise the logical volumes LVF and LVI are candidates for exchange. There is no logical volume as a candidate for exchanging with the LVG logical volume in the specific embodiment shown in FIG. 2.

Using the functional criteria, the potential logical volumes that could be swapped with the logical volume M1-LVA in the physical drive 31A include logical volumes LVE, LVH and LVJ, assuming that an exchange with a mirror would have no effect. Swapping the LVA logical volume in physical disk 31A with any of the logical volumes LVB through LVD in physical drive 31E is precluded because both mirrors of the logical volume LVA would be resident on the same physical disk drive. Other potential logical volume pairs include the pairs LVE-LVH, LVH-LVJ and LVE-LVJ. The logical volumes LVF and LVI define one exchangeable pair. Thus in this particular embodiment there are twenty-seven possible exchangeable pairs of logical volumes.

Figure 2A:
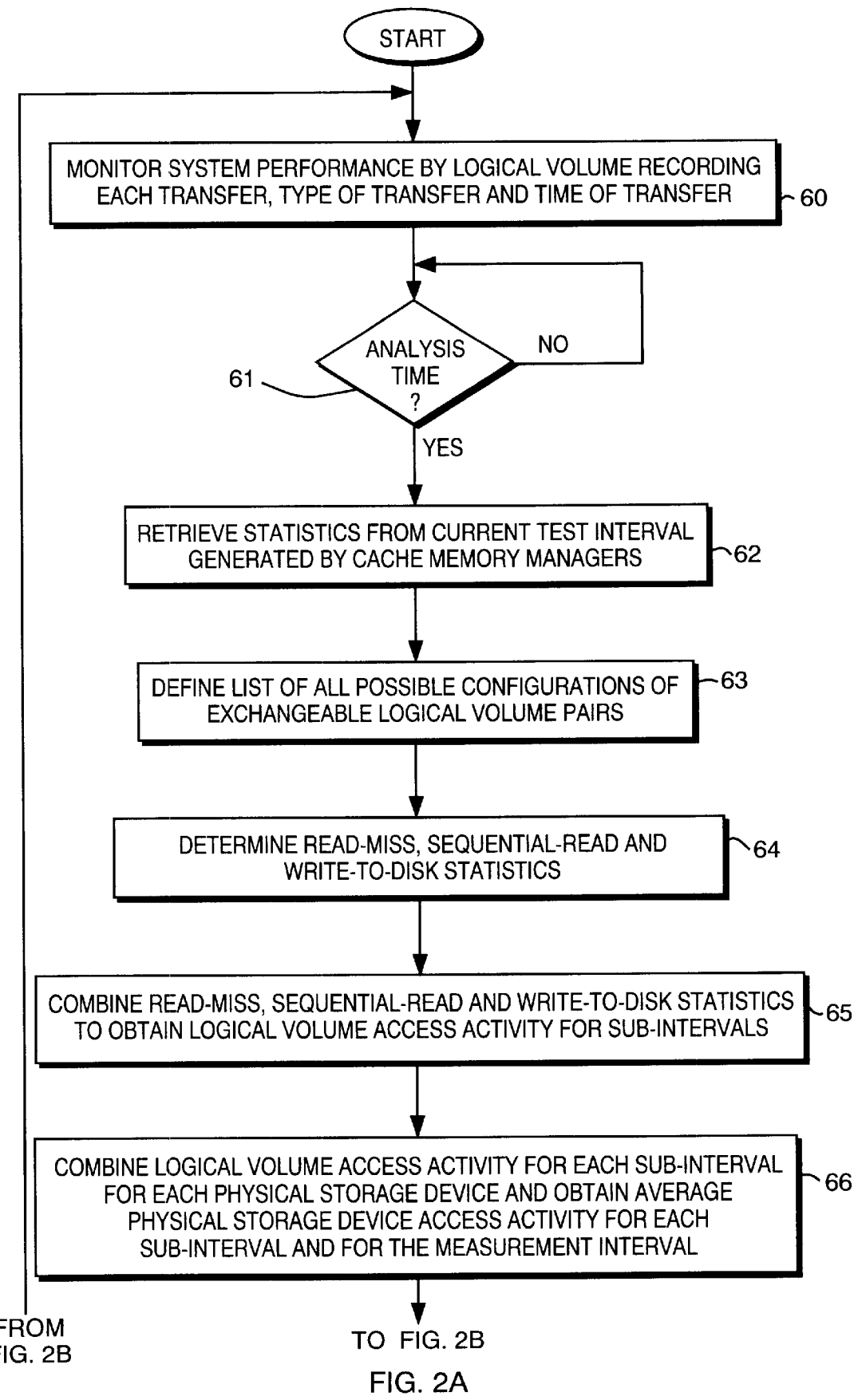
FIGS. 2A and 2B constitute a flow diagram that depicts one procedure for exchanging logical volumes in accordance with this invention.

In step 64 of FIG. 2A, the load balance program uses the accumulated statistics and read-hit ratio to produce a read-miss value, a sequential-read value and a write-to-disk value for each logical volume over the prior test interval.

In step 65 the load balancing program 51 constructs a table that identifies the total access or total weighted access activity value for each physical storage device by summing, for each physical disk storage device, the access activity values for each logical volume on that physical disk storage device. At this point a total average physical activity value can also be obtained by summing the physical volume access activity values and dividing by the number of physical devices.

Figure 2B:
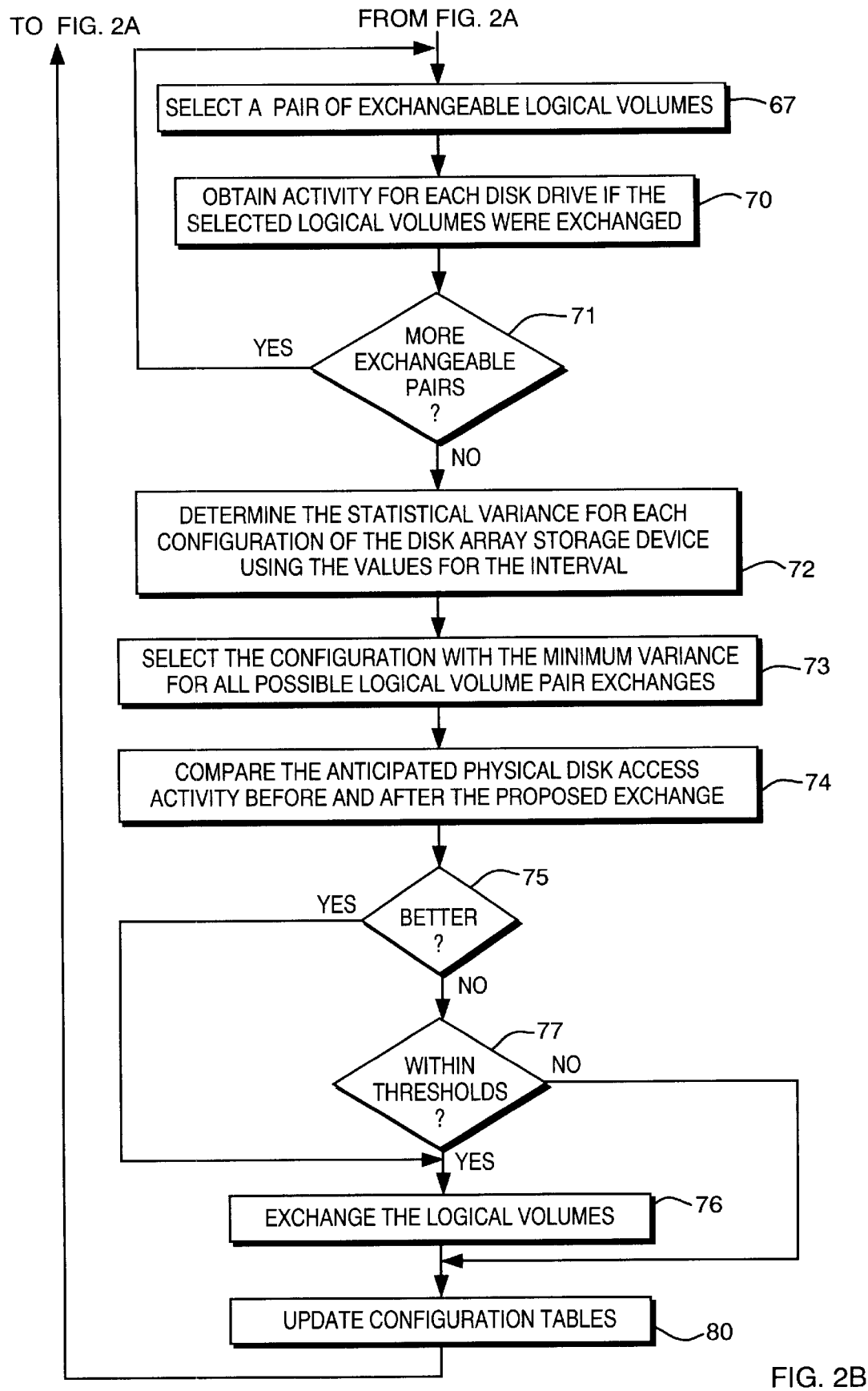

When step 66 in FIG. 2A has been completed, control passes to steps 67 and 70 that form a loop under a loop control 71 in FIG. 2B. Specifically step 67 selects a pair of logical volumes from the list developed in step 63 of FIG. 2A. Assume, for example, that the pair M1 LVA-LVE is selected. In step 70 the load balancer program 51 utilizes the accumulated statistics for obtaining the activity for each physical disk drive as if those two logical volumes had been exchanged. This loop continues until all the logical volume pairs in the list have been evaluated. Once this occurs, control branches to step 72 to define a statistical variance for each configuration according to:

$$|E(x^2)-[E(x)]^2|_{min} \tag{1}$$

That is, for each possible configuration the load balance program 51 step 72 determines the average access activity value for the physical disk storage devices with the logical volume pairs and obtains a difference from the average physical drive access activity value obtained in step 65 assuming each pair is exchanged. Thereafter step 72 produces the statistical variance for each logical volume pair exchange. In step 73 the load balancer program 51 selects a logical volume pair that produces the minimum statistical variance. Processes for obtaining the above-identified statistical variances are well known in the art.

After that selection, the identity of the logical-volume pair is used in a pretest of the selection. As previously indicated, the monitor 50 accumulates data as discrete sets on a periodic and recorded time basis. In step 74 the load balancing program breaks the total test interval into subintervals that may include one or more sampling periods. Next the activity values for each subinterval or group of subintervals are determined. If the access activity value for exchange effected physical drives is less than the original, step 75 branches to step 76 to initiate the exchange. If a subinterval exists that exceeds the average, step 77 determines whether the access activity value is within an acceptable limit. If it is, the exchange occurs in step 77 and the configuration tables in the system are updated to reflect the new configuration. Otherwise no exchange is made.

Figure 3:
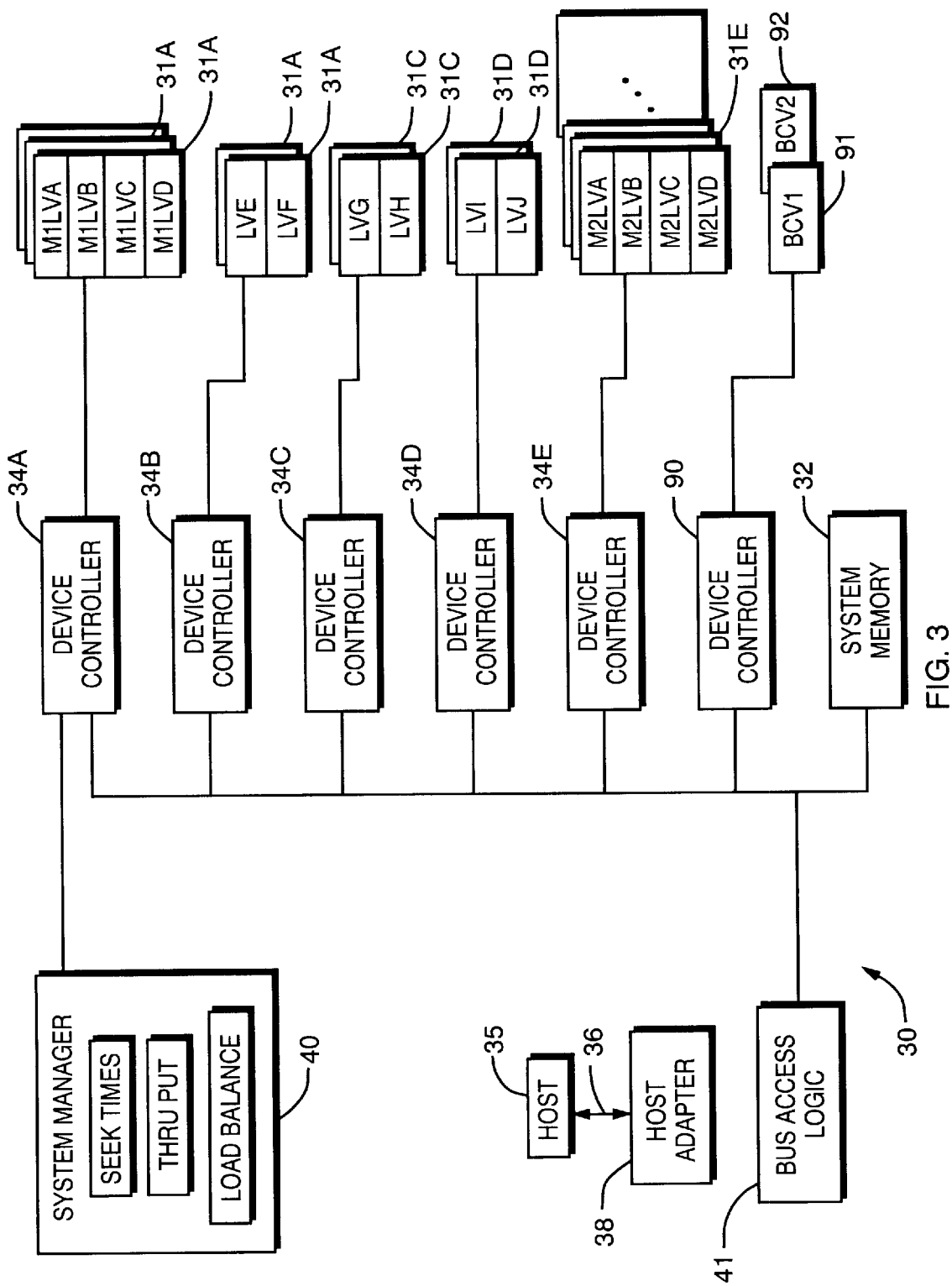
FIG. 3 is a block diagram of another specific data processing system that provides another type of data exchange.

FIG. 3 depicts a modification of the circuit of FIG. 1 in which like reference numerals apply to like items. The modification of FIG. 3 primarily consists of the addition of one or more device controllers, such as a device controller 90 with two specially configured logical volumes 91 and 92. These are a type of BCV device as described in the foregoing U.S. Pat. No. 6,088,766.

These devices are called data relocation volumes (DRV's) to distinguish them from BCV devices. They operate in response to the same ESTABLISH and SPLIT commands as BCV devices. The major difference for the purposes of understanding this invention lies in the fact that these devices are internal storage volumes that are only accessible to a system operator through the system manager console or service processor 40. They are not directly available to user or application generated I/O requests. However, they will act like a BCV when paired with a logical volume that is available to user or application software. Thus, if a user or application generated write request is received by the logical volume, that write request will be received by the established DRV. In addition, a DRV logical volume responds to other commands not incorporated in a conventional BCV device.

Figure 4A:
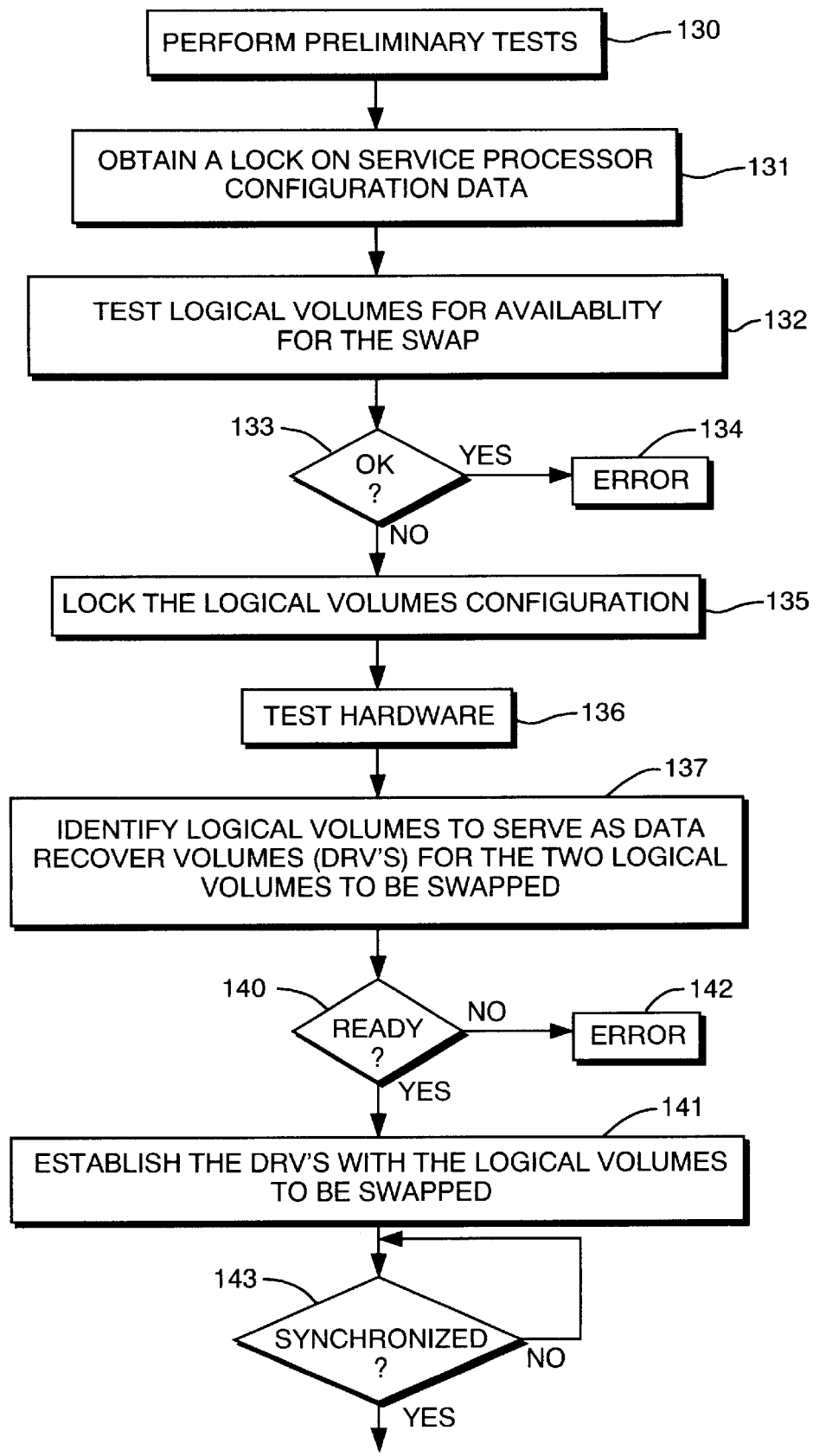
FIGS. 4A and 4B constitute a flow diagram that depicts a procedure for exchanging logical volumes in accordance with this invention.
Figure 4B:
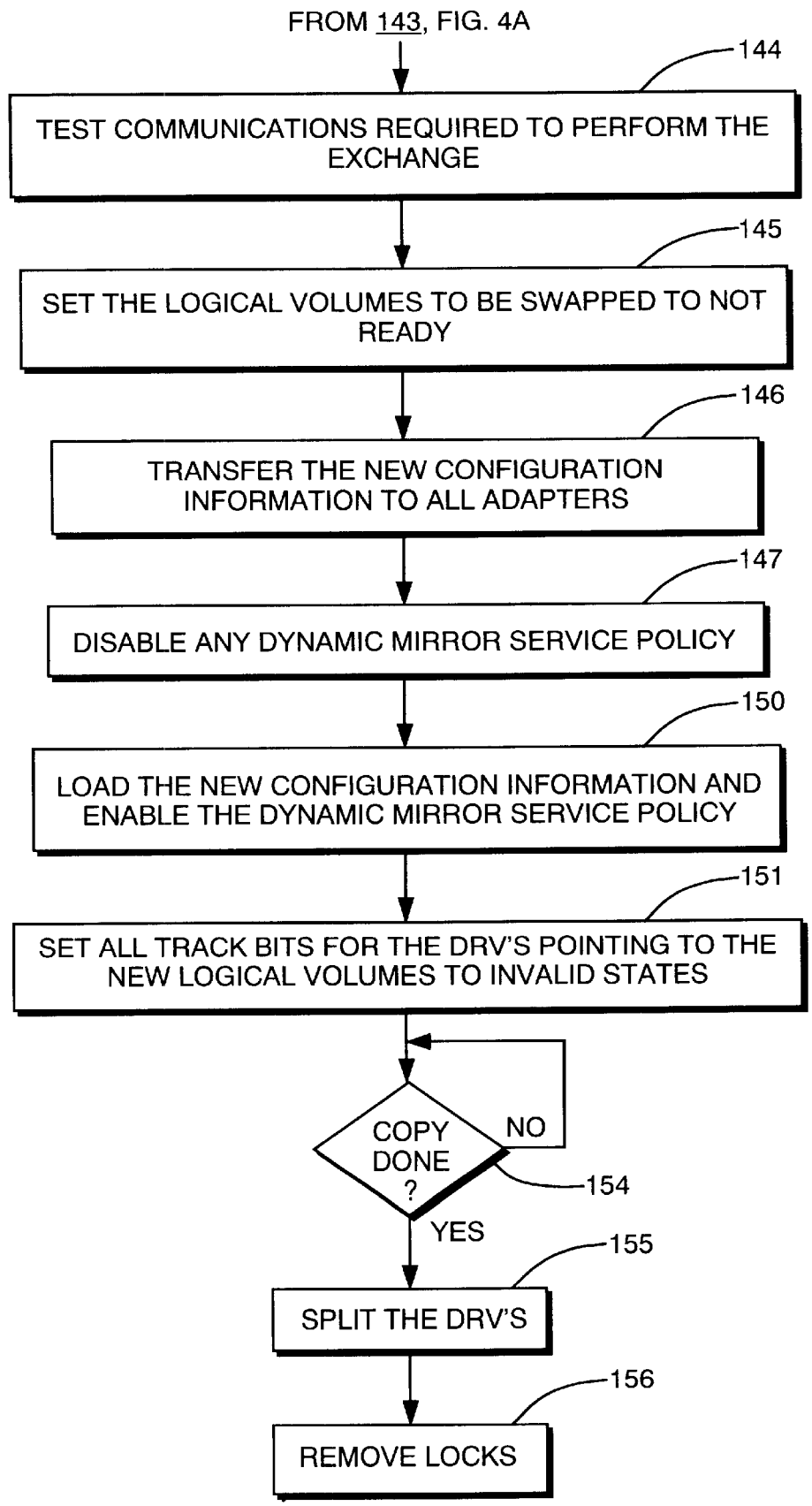
Figure 5A:
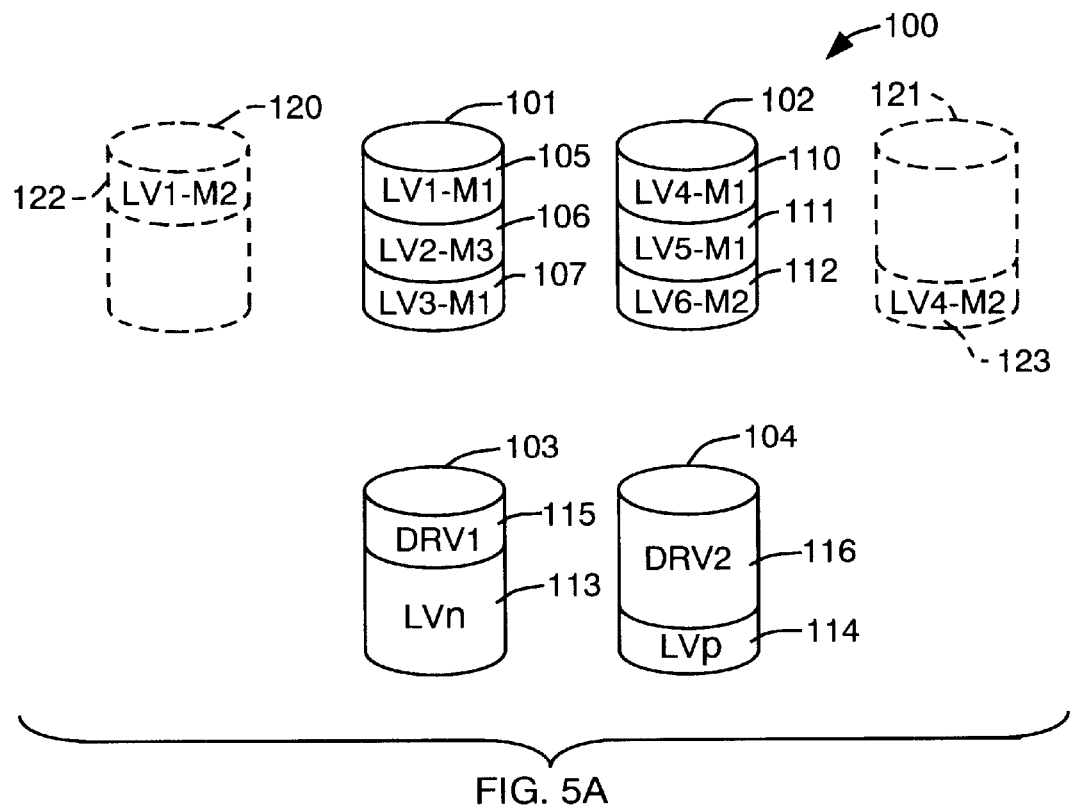
FIGS. 5A through 5E graphically depict stages of an exchange and will be useful in understanding the procedure of FIGS. 4A and 4B.

When it is desired to make an exchange to reallocate a pair of logical volumes, the system manager console or service processor 40 uses the procedures set forth in FIGS. 4A and 4B to control a configuration of logical volumes. FIG. 5A depicts a number of logical volumes 100 for use in such an exchange. For purposes of understanding the basic operation of this invention, four physical disk drives need to be considered. They include physical disk storage devices 101, 102, 103 and 104. Physical disk storage device 101 is depicted as including three logical volumes including an M1 mirror of logical volume LV1, that is stored in a section or partition of the physical disk storage device 110; i.e., the LV1-M1 logical volume 105. In this embodiment the physical disk storage device 101 is also depicted as storing data in an LV2-M3 logical volume 106 and LV3-M1 logical volume 107. The physical disk storage device 102 includes an LV4-M1 logical volume 110, an LV5-M1 logical volume 111 and an LV6-M2 logical volume 112. For purposes of understanding this invention, the LV1-M1 logical volume 115 and the LV4-M1 logical volume 110 are relevant.

The physical disk storage devices 103 and 104 include LVn and LVp logical volumes, 113 and 114. Additional storage volumes are available in the form of volumes 115 on physical disk storage device 103 and volume 116 on physical disk storage device 104. The logical volumes 115 and 116 are also relevant to this invention.

FIG. 5A depicts two additional physical disk storage devices 120 and 121 in phantom. These are physical disk storage devices that contain a second mirror for the LV1 storage volume i.e., LV1-M2 logical volume on the physical disk storage device 120 and an LV4-M2 logical volume 123 on the physical disk storage device 121 as a second mirror for the LV4 logical volume. Interactions of mirrored logical volumes, such as the LV1-M1 and LV1-M2 mirrored logical volumes and the LV4-M1 and LV4-M2 mirrored logical volumes, are known. These mirrored logical volumes are shown because this invention normally will be implemented with mirrored logical volumes. As will become apparent, however, this invention is also useful in exchanging non-mirrored logical volumes.

Referring again to FIG. 4A, when a system operator initiates an exchange through the system manager console or service processor 40 the operator supplies the identity of the logical volumes to be exchanged, such as the LV1-M1 and LV4-M1 logical volumes 105 and 110. The system operator also identifies two logical volumes to be used as data relocation volumes, designated as DRV1 and DRV2 volumes 115 and 116 in FIG. 5A.

In such devices, many of the control functions are performed by microprocessors operating under various versions of microcode. Initially the system manager 40 will perform a number of tests in step 130 to verify various operating conditions. Step 130 might, for example, determine the presence and availability of necessary files and might verify that the microprocessor or microprocessors to be involved with the exchange are operating with appropriate code versions. Those tests typically will be passed. If they are not, an error message, not shown in FIG. 4A, will be generated. Various steps and procedures for performing such tests are well known to persons of ordinary skill in the art.

Step 131 obtains a lock on relevant configuration data in the service processor 40. Locking processes, as known, assure that certain programs, in this case programs other than the exchange program, can not effect locked information. This allows the remaining steps in FIGS. 4A and 4B to occur without any possibility of other programs producing some conflict or corrupting configuration data.

The various logical volumes designated by the exchange command are also tested in step 132. These tests include, for example, determining of all the bit track positions in a track table are valid, determining that the logical volumes are in a Ready State and no user has requested a BCV Establish operation with the logical volume. Other tests might be used as tests in addition or in lieu of such tests. If any test fails, control transfers from step 133 to step 134 to announce this condition. If all the tests pass, control transfers to step 135 to lock the logical volume configuration, again so that the configuration information can not be modified inadvertently. Step 136 then undertakes a test of various hardware components in the configuration to assure proper operation of the exchange. These tests are analogous in scope to the tests performed in step 130.

Step 137 identifies the two internal disk volumes or data relocation volumes that are to be swapped. In the specific example of FIG. 5A, these are the DRV1 and DRV2 logical volumes 115 and 116. The best match occurs in this process when the selected DRV logical volumes, such as the DRV1 and DRV2 logical volumes 115 and 116, are a good match to the logical volumes to be swapped, in this case, the LV1-M1 and LV4-M1 logical volumes 105 and 110.

The selection process may also be required to follow other rules. For example, DRV logical volumes may be precluded if they reside on the same spindle with another mirror of the same logical volume. In this embodiment the DRV1 logical volume 115 should not be on the physical disk storage device 120. The DRV logical volume must be at least the same size and have the same format as the logical volumes being exchanged. In this case it is assumed that the DRV1 logical volume 115 is the same size as the LV1-M1 and LV4-M1 logical volumes. The logical DRV2 volume 116 is depicted as having an alternate and acceptable larger storage capacity. Alternatively the DRV2 logical volume could be configured to an exact size and allowing any remaining portion of the physical disk storage device, or unassigned portion of the physical disk storage device to be used for other purposes.

Other tests may insure that the DRV1 and DRV2 logical volumes 115 and 116 are not on the same memory bus of the other mirror, such as the memory bus connecting to the LV1-M2 logical volume 122 or the LV4-M2 logical volume 123. In certain embodiments, it may be required that the data relocation volumes also not be on a dual disk adapter or device controller of the other mirror or not on the same disk adapter as the other mirror.

If all of these conditions, or others are satisfied, step 140 transfers control to step 141. Otherwise an error condition exists and control transfers to step 142 to generate an appropriate error message.

As control transfers to step 141, the configuration of relevant physical disk storage devices and logical volumes is shown in FIG. 5A. Step 141 in FIG. 4A issues an ESTAB- LISH command to each of the logical volume pairs. The first pair includes the LV1-M1 and DRV1 logical volumes 105 and 115; the second pair, the LV4-M1 and DRV2 logical volumes 110 and 116.

In the particular implementation of the assignee of this invention, each logical volume includes a device header and each device header includes a track table for up to four mirrors. The track tables effectively define a two-dimension matrix in which each column represents one of a number of logical volume mirror, M1, M2, M3 and M4. Each row corresponds to a track in that logical volume. As described in the above-identified U.S. Pat. No. 6,101,497, the ESTABLISH command operates by assigning one of the logical volume mirrors for the LV1 logical volume 105 (e.g., the bit positions in the M3 column in the track table to an invalid state. A second ESTABLISH command performs the same function with respect to the LV4-M1 logical volume 110 and the DRV2 logical volume 116. In response to two ESTABLISH commands, a copy program in each of the device controllers, also called disk adapters, associated with the LV1-M1 logical volume 105 and the LV4-M1 logical volume 110, test their respective M3 track status bits. For each invalid bit, the copy program transfers the data in the corresponding track to the appropriate one of the DRV1 or DRV2 logical volumes 115 and 116. As will be apparent, the two ESTABLISH commands can issue essentially simultaneously and the transfer of data to the two DRV logical volumes occurs simultaneously.

Figure 5B:
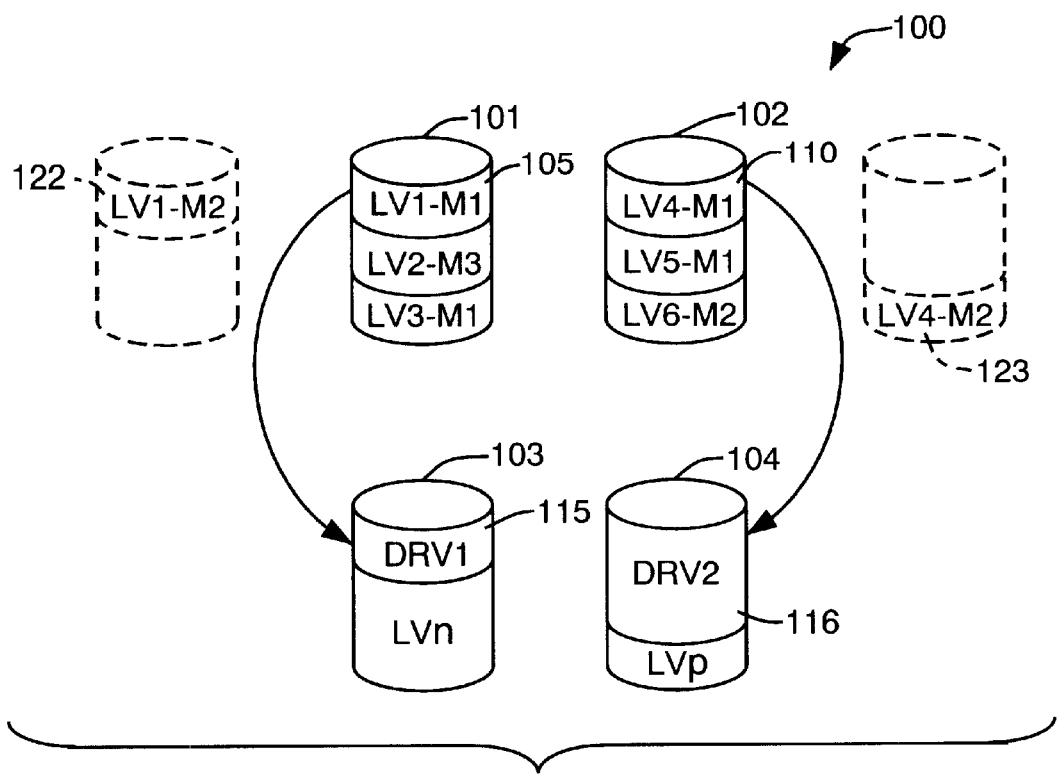

As with a BCV device, these transfers occur in parallel with and concurrently with any transfers of data from user or application software generated I/O requests to the LV1 and LV4 logical volumes. Thus the operation does not produce any interruption in the operation of user or application software utilizing the data in these logical volumes. FIG. 5B depicts these transfers in response to the ESTABLISH commands.

It will be apparent that through this process an original level of data redundancy for reliability remains the same. That is, in this embodiment in which the data in the LV1 logical volume is replicated in two mirrors, the data in LV1 logical volume remains replicated in the logical volumes 105 and 122 during the ESTABLISH process. Immediately upon reaching synchronism a third copy of the data exists in the DRV1 logical volume 115.

When synchronization does occur, step 143 transfers control to step 144 in FIG. 4B. Synchronization is an example of an event that enables the following steps beginning with 144 to proceed. Other events might also be used as complementary or additional tests to be performed at this point in the process.

Step 144 test various communications paths required to perform the exchange. This may include some host processor dependant operations or test. Other tests will involve data located in the system manager 40 or in the various device controllers or disk adapters associated with the system. As indicated in the above-identified U.S. patent application Ser. No. 08/396,146, communications among the system manager console 40 and the various disk adapters occur through mailboxes. Tests in step 144 also assure that the mailboxes are accurately assigned and that other processes necessary for effecting a reconfiguration are operating appropriately. Any problem encountered will, produce an error message, although generation of such an error message is not shown in FIG. 4B.

Figure 5C:
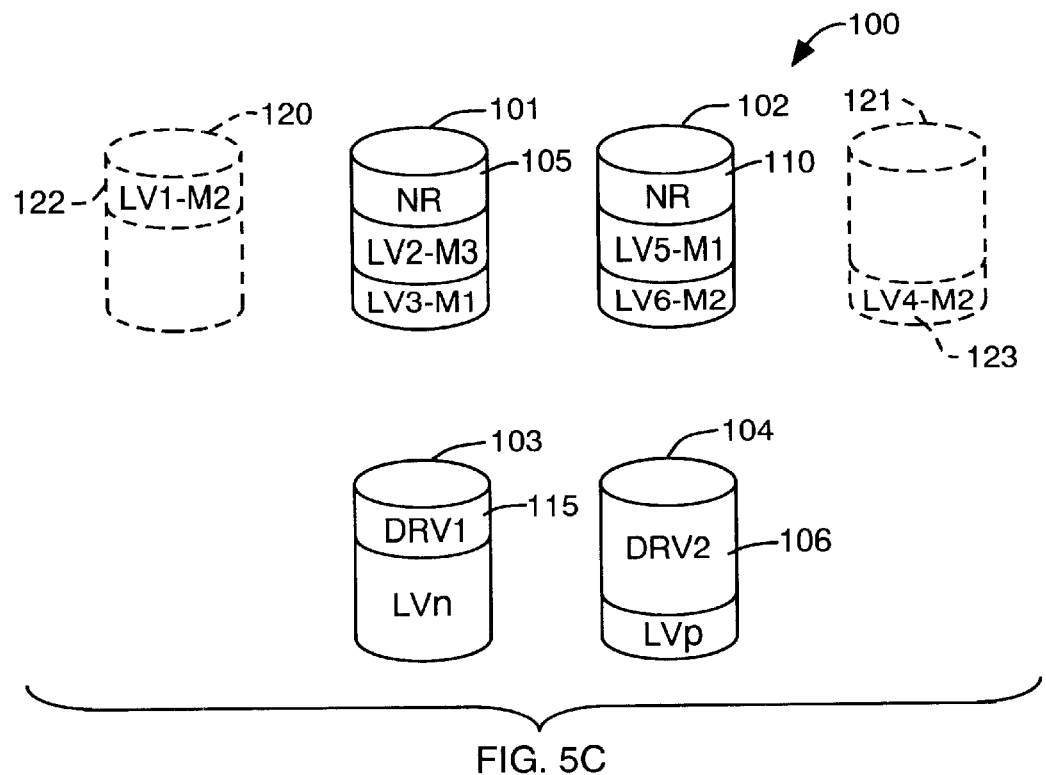

When all the foregoing tests are completed, step 145 sets the logical volumes corresponding to the LV1-M1 and LV4-M1 logical volumes to a Not Ready status as shown in FIG. 5C. As; a result, write operations to the LV1 and LV4 logical volumes will be routed to the DRV1 and DRV2 volumes 115 and 116 respectively, but will not update data in the logical volumes 105 and 110. However, even with the logical volumes 105 and 110 being not ready, the original level of redundancy is maintained.

In the specific example, that portion of the physical disk storage device 101 represented by reference numeral 105 is configured as a new LV4-M1 logical volume and while the portion 110 on the physical disk storage device 102 is configured as a new LV1-M1 logical volume. Step 146 establishes this new configuration by loading the new configuration information into mailboxes for transfer to the various disk adapters or controllers.

Step 147 then disables any dynamic mirror service policy. In accordance with U.S. Pat. No. 5,819,310 issued Oct. 6, 1998 and assigned to the same assignee as this invention, a dynamic mirror service policy determines how data may be read from different logical volumes. In a simple approach, data on a first number of tracks might be read from the LV1-M1 logical volume while the data on the other tracks might be read from the LV1-M2 logical volume 122 on the physical disk storage device 120. Step 147 disables this policy in order to avoid any conflicts that might otherwise arise should a change to the dynamic mirror service policy be attempted during the reconfiguration process.

Step 150 then loads the new configuration information and enables the dynamic mirror service policy. Step 151 sets all the bit positions in the corresponding ones of the M1-M4 columns of the track tables for the new LV1-M1 and new LV4-M1 logical volumes 105 and 106, respectively, to invalid states.

Figure 5D:
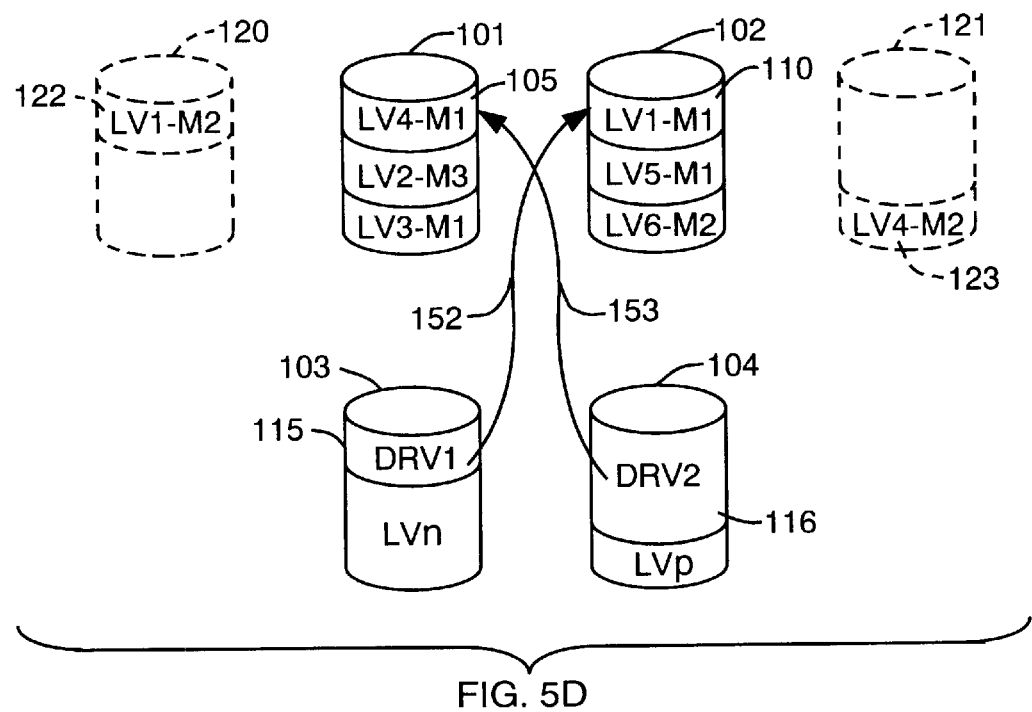

Now a copy program associated with the DRV1 logical volume 115 or the new LV1-M1 logical volume 110 transfers the data to the newly configured LV1-M1 logical volume 110 on the physical disk storage device 102 as represented by arrow 152 in FIG. 5D. Another copy program associated with the DRV2 logical volume 116 or new LV4-M1 logical volume 105 transfers the data to the newly configured LV4-M1 logical volume 105 on the physical disk storage device 101 as represented by the arrow 153.

Referring again to FIG. 4B, step 154 monitors these data transfers until all the data has been copied. When this occurs, there are again three copies of the data in each of the LV1 and LV4 logical volumes assuming there originally were two mirrors for this data.

Figure 5E:
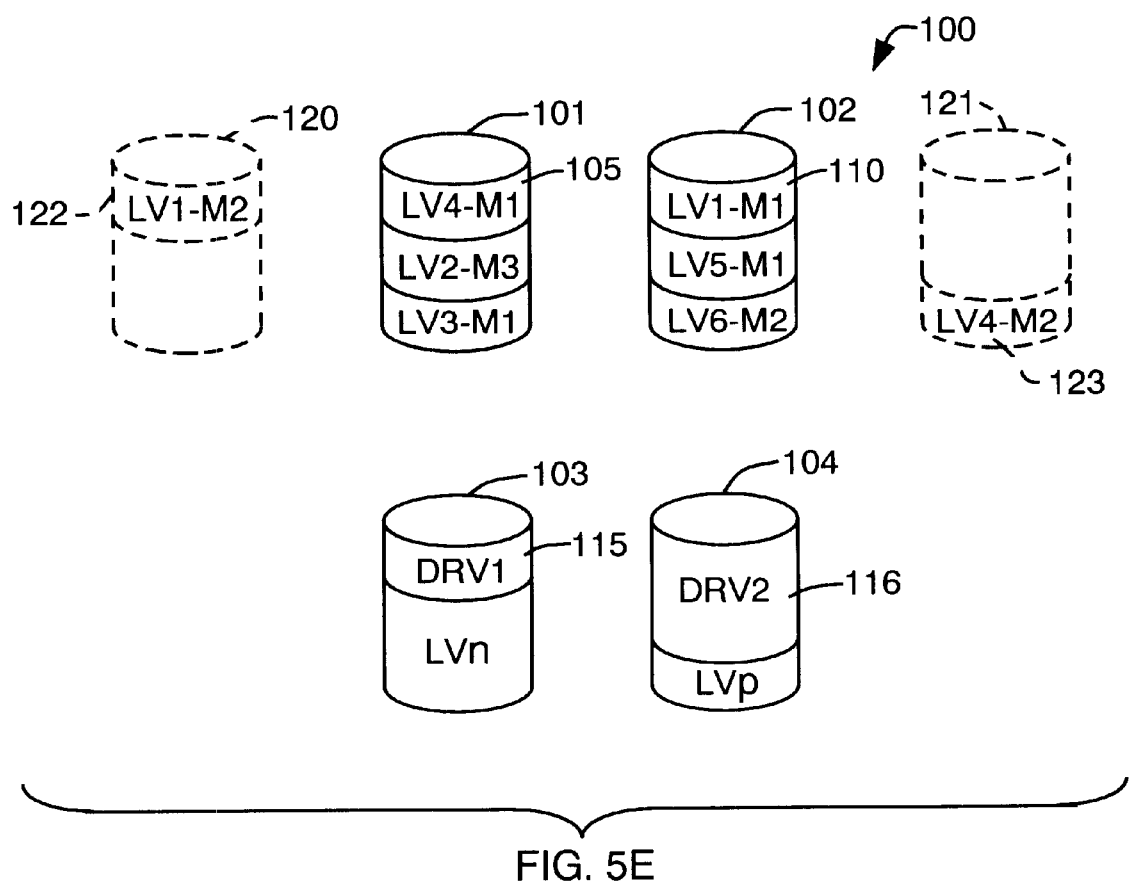

Step 155 then splits the DRV logical volumes so they are isolated from further responses to I/O requests from user or application generated software. With this step, and as shown in FIG. 5E, the data in M1 mirrors for the LV1 and LV4 logical volumes have been exchanged. The LV1-M1 logical volume data now resides in location 110 of physical disk storage device 102 while data in the LV4-M1 logical volume resides in the logical volume 105 of physical disk storage device 101. After the split occurs, step 156 removes the locks, particularly the locks applied during steps 131 and 132 so that the restrictions imposed by the process are released. All the operations involved with the exchange by the system manager console 40 then terminate.

In summary, this foregoing disclosure defines a method and apparatus for balancing the load in a magnetic disk storage system comprising a plurality of physical disk drives. Typically each disk drive is divided into multiple logical volumes. Statistics of the occurrence of read, write, and sequential prefetch read operations are maintained over at least an analysis interval as a function of time. This data provides disk utilization information that can be used in the selection of two candidates for a logical volume exchange. When a pair has been selected, the procedure of FIGS. 4A and 4B, A enable the exchange to occur with minimal interruption to normal data processing operations.

The foregoing description discusses this invention in terms of data organized into blocks of contiguous storage locations on a physical disk of known size called logical volumes. However, the invention is applicable to other data organizations. In some applications, for example, a logical volume might be divided into a series of sub-volumes distributed across plural physical disk storage devices. Such a division could be made for redundancy and recovery purposes or for load distribution purposes. Each block, whether a logical volume, sub-volume or other grouping, constitutes a block of contiguous storage locations of a predetermined size. Conversely and consequently, a block then can be a single logical volume, sub-volume or other grouping.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters patent of the United States is:

1. A method for exchanging data stored in a first logical volume having a first data processing identification with data stored in a second logical volume having a second data processing identification comprising the steps of:
   A) establishing a data transfer path between the first logical volume and a third logical volume and a data transfer path between the second logical volume and a fourth logical volume,
   B) copying the data in the first and second logical volumes to the third and fourth logical volumes, respectively, independently of and concurrently with responses to I/O requests to the first and second logical volumes,
   C) disabling data transfers to the first and second logical volumes whereby I/O requests are directed to be processed by the third and fourth logical volumes, respectively,
   D) configuring the first logical volume to have the second data processing identification and the second logical volume to have the first data processing identified, and
   E) transferring data in the third logical volume to the second logical volume with the first data processing identification and the data in the fourth logical volume to the first logical volume with the second data processing identification.

2. A method as recited in claim 1 wherein said configuring includes:
   i) changing the designations of the first and second logical volumes,
   ii) designating the data in the first and second logical volumes as invalid, and
   iii) enabling the first and second logical volumes to receive data from the third and fourth logical volumes, respectively.

3. A method as recited in claim 2 wherein each of the first and second logical volumes is a member of first and second sets of mirrored logical volumes and, as a result of said configuring, the first and second logical volumes become members of the second and first sets of logical volumes, the data source for said transfer of data to said first logical volume being the fourth logical volume and other members of the second set of mirrored logical volumes and the data source for said transfer of data to said second logical volume being the third logical volume and other members of the first set of mirrored logical volumes.

4. A method as recited in claim 3 wherein said establishment of data transfer paths is independent of the operations of the other mirrored logical volumes in the first and second sets.

5. A method for exchanging data stored in a first logical volume that is configured as a mirror in a first set of mirrored logical volumes with data stored in a second logical volume that is configured as a mirror in a second set of mirrored logical volumes comprising the steps of:
   A) establishing a data transfer path between the first logical volume and a third logical volume and a data transfer path between the second logical volume and a fourth logical volume,
   B) copying the data in the first logical volume to the third logical volume and copying the data in the second logical volume to a fourth logical volume independently of and concurrently with responses to I/O requests to the first and second logical volumes,
   C) upon completion of said copying, reconfiguring the first and second logical volumes to be mirrors in the second and first sets of mirrored logical volumes, respectively, and
   D) transferring data in the first and second sets of mirrored logical volumes to the reconfigured second and first logical volumes, respectively.

\* \* \* \* \*